June 20, 1944.   P. S. YUJUICO ET AL   2,351,893
AIRCRAFT
Filed Nov. 27, 1941   2 Sheets-Sheet 1

INVENTORS
PEDRO S. YUJUICO &
DAVID B. THURSTON
BY
Bean, Brooks, Buckley & Bean
ATTORNEYS

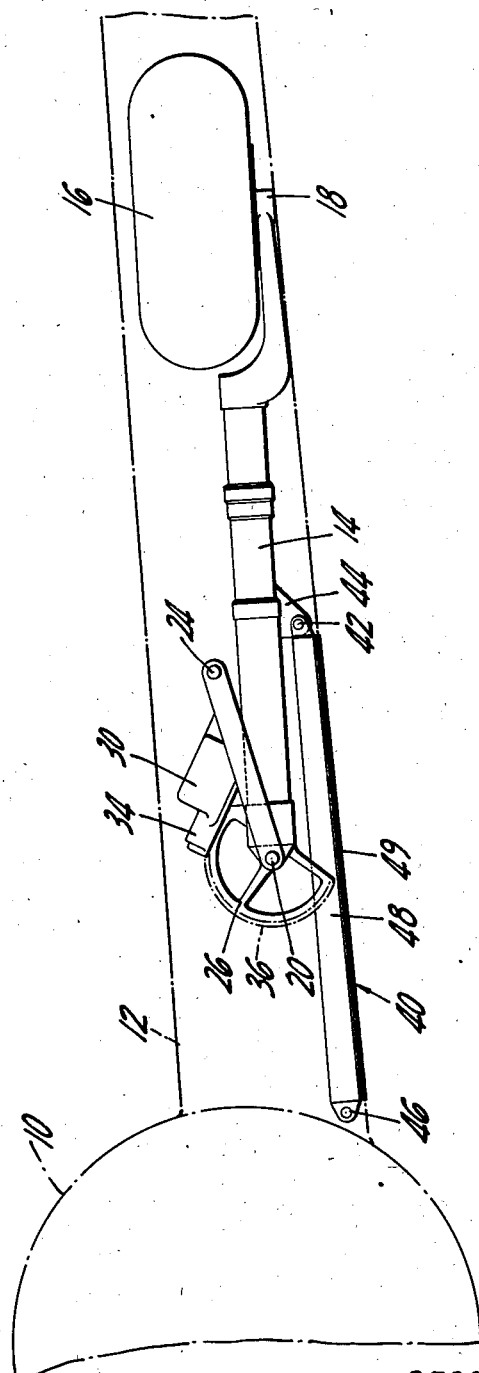

Patented June 20, 1944

2,351,893

UNITED STATES PATENT OFFICE 2,351,893

AIRCRAFT

Pedro S. Yujuico, Great Neck, and David B. Thurston, Jamaica, N. Y., assignors to Brewster Aeronautical Corporation, Long Island City, N. Y.

Application November 27, 1941, Serial No. 420,656

2 Claims. (Cl. 244—102)

This invention relates to aircraft; and more particularly to improved retractable landing gear mechanisms for airplanes and the like.

One of the objects of the invention is to provide an improved undercarriage of the retractable type which is particularly adapted for use to advantage in connection with heavy duty airplanes having relatively large diameter propellers. Another object of the invention is to provide an improved retractable landing gear for airplanes which is structurally simple and of such character as to be automatically self-locking in every retraction-extension position thereof. Another object of the invention is to provide an airplane landing gear having the above features and characteristics and which is also adapted to fold while being retracted so as to reduce the extent of the main support strut mechanism thereof for nesting within the airplane fixed structure in improved manner. Another object of the invention is to provide an improved airplane landing gear which is adapted to fold upon retraction and to unfold during extension in an improved manner while being firmly braced so as to be stable in all of its positions of retraction-extension. Other objects and advantages of the invention will appear from the specification hereinafter.

In the drawings:

Fig. 4 is a view corresponding to Fig. 1 but showing the landing gear mechanism in retracted position.

Figure 1:
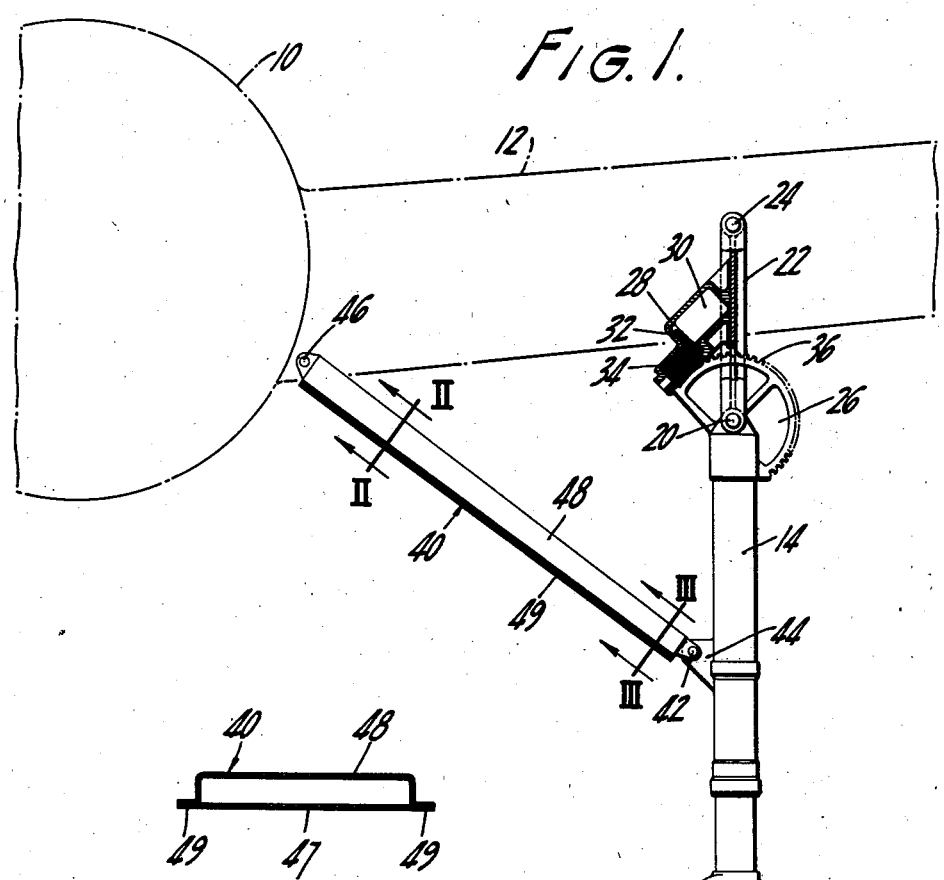
Fig. 1 is a fragmentary front elevation of an airplane having a landing gear mechanism of the invention shown in extended or airplane landing condition.

The invention is illustrated in connection with an airplane comprising a fuselage 10 and a wing panel 12 extending laterally therefrom. It will be understood that in the interest of simplifying the specification and drawings, only one side of the airplane and the corresponding portion of the landing gear mechanism thereof is illustrated; and that the airplane will include a duplicate landing gear mechanism similarly mounted upon the opposite wing panel to provide an airplane structure symmetrical about the front view center line of the airplane.

The landing gear of the drawings comprises a main support strut 14 which is illustrated as being of telescopic shock-absorbing type and carrying a landing wheel 16 by means of an axle 18 at its lower end. The main strut 14 terminates at its upper end portion short of the region of its connection to the wing panel 12, and carries a transverse pin 20 for pivotal connection with the lower end of a forked link 22 which is in turn pivotally mounted at its upper end by means of a pivot pin connection device 24 upon a suitable fixed portion of the wing panel structure. The main strut 14 is provided at its upper end with a sector-like crank portion 26 arranged concentrically of the axis of the pivot device 20 and so as to extend radially therefrom between the forked lower end portions of the link 22.

The link 22 is formed with a laterally extending bracket portion 28 for carrying an electric motor as at 30 and a gear train 32. The gearing 32 couples the motor 30 to a worm gear 34 which is rotatably mounted upon the bracket 28. The parts are so proportioned and arranged that the worm 34 meshes with the exteriorly toothed portion 36 of the crank sector 26 and thus it will be understood that whenever the motor 30 is energized to drive the worm 34 the sector portion 26 will thereby be rotated relative to the link 22 about the axis of the pivotal connection 20 so as to cause the strut-link assembly 14—22 to fold or unfold about the axis of the pivot pin 20, depending upon the direction of operation of the motor 30. It will be seen that by this arrangement of the parts, when the main wheel carrying strut is in vertically extended position, the thrust axis of the worm 34 is directed generally upwardly toward the upper pivoted end of the bracket 22 (as clearly shown in Figure 1 of the drawings).

Figure 2:
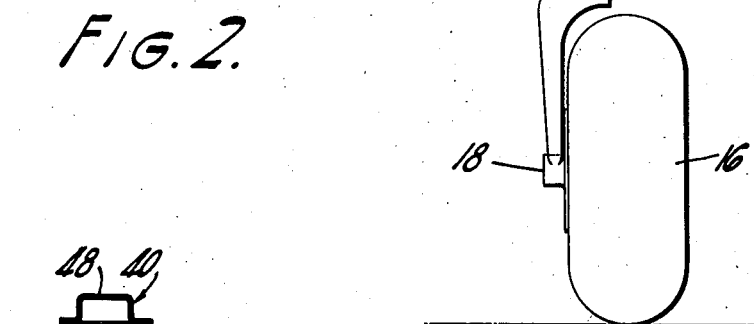
Fig. 2 is a section taken substantially along line II—II of Fig. 1.
Figure 3:
Fig. 3 is a section taken substantially along line III—III of Fig. 1.

A lateral brace for the main strut 14 is provided in the form of a generally triangularly shaped strut 40 which is pivotally connected at its lower end by means of a pivot pin device 42 to a laterally extending lug portion 44 of the main strut. The brace strut 40 is formed to diverge in plan view from its lower end portion so as to be extended in directions longitudinally of the airplane in the region of its upper end portion (Figs. 2 and 3). At its upper end the brace 40 is pivotally connected to a suitable fixed structural portion of the airplane by means of a pivot connection device as indicated at 46. The brace strut 40 is fabricated of sheet metal material or the like, as illustrated by Figs. 1—3, so as to comprise a base plate portion 47 and a hat shaped portion 48 spot welded or otherwise attached to the plate 47 so as to provide a closed structure of generally rectangular section having laterally extending flange portions 49 at the lower opposite edges thereof which are adapted to register in flush relation with the lower wing skin structure when the landing gear is in retracted position, as will be explained more fully hereinafter.

The main strut and link and brace elements of the landing gear mechanism are so relatively proportioned and arranged that when the strut-link assembly 14—22 is in straight line extended form, as illustrated in Fig. 1, the brace strut 40 will be disposed to extend downwardly and outwardly from the airplane to brace the strut-link assembly in an upright attitude for support of the airplane upon a landing surface. Thus, it will be understood that when the gear is in extended position the strut-link assembly will function as a single rigid vertical strut extending downwardly from the wing panel 12 and carrying the landing wheel 16 at its lower end; while the brace strut 40 will brace the wheel strut and link assembly 14—22 against movement relative to the airplane in directions both longitudinally and laterally thereof. It will also be understood that since the operative connection between the main strut 14 and the link 22 includes the worm and gear arrangement 34—36, the gear connection arrangement is of so-called irreversible character, that is; inoperable by forces transmitted through the strut-link members, and is thereby self-locked so as to provide the strut and link assembly 14—22 of rigid character when in any position of adjustment.

When the motor 30 is energized to drive the worm from the position of Fig. 1 relative to the gear wheel 26 toward the position of Fig. 4, the strut-link assembly 14—22 will be caused to fold about the axis of the pivot device 20. This action will cause the effective length of the strut-link assembly between the positions of the pivotal connection 24 and the brace strut connection 42 to be shortened, whereby the brace strut 40 will be caused to pivot upwardly upon its pivot connection 46. Consequently, as the link portion 22 rotates in clockwise direction relative to the sector 26 from the position of Fig. 1 toward the position of Fig. 4 under the driving action of the worm 34, the main strut 14 will be simultaneously rotated counterclockwise about the pivot connection 42 and lifted bodily so as to be ultimately disposed horizontally and in completely nested relation within the contour of the wing panel 12, as illustrated by Fig. 4. Upon energization of the motor 30 to operate in reverse direction the strut-link assembly will be caused to move reversely so as to unfold; and the wheel carrying strut will be motivated to return to its extended or airplane landing position, as illustrated in Fig. 1.

Thus, it will be understood that the landing gear mechanism of the invention is of structurally simple and rugged form and provides for automatic folding of the main support structure in connection with retraction thereof into the airplane wing, whereby the spanwise extent of the landing gear structure is substantially shortened prior to its being lifted into retracted position within the contour of the wing. Consequently, the space required for nesting of the landing gear within the airplane wing is of reduced extent spanwise of the wing; and by reason of this feature of the invention a landing gear mechanism having a relatively long wheel carrying strut dimension when in airplane landing position may be provided in conjunction with a wing of relatively small spanwise dimension.

Thus, the invention is of particular importance for use in connection with modern high speed high powered military airplanes or the like wherein wings of relatively short span dimension are indicated for high speed performance while relatively large diameter propellers are required for efficient power output performance. The main support strut and link assembly of the undercarriage of the invention may be easily proportioned to extend below the airplane for sufficient distance when in landing gear extended condition to provide the required clearances for large diameter propellers relative to the landing surface; and upon retraction of the gear the relatively long main support strut assembly automatically folds to nest compactly within a portion of the wing having a relatively short spanwise dimension.

It is of course contemplated that the motor device 30 will be of reversible type, and that suitable power supply conductors (not shown) will be arranged to lead therefrom to the airplane battery or other power supply source and to a suitable control switch mechanism disposed within the pilot cockpit. Thus, the gear actuating mechanism will be so arranged as to be remotely controlled and to apply actuating power directly to the relatively movable elements of the mechanism through use of a minimum of power transmission parts, and that the operation of the gear is always positive and irreversible in the sense that forces from externally of the airplane transmitted through the strut and brace members are incapable of resolution into undercarriage extension-retraction movements. Therefore, the mechanism is self-locking at all stages of retraction-extension; and, as explained hereinabove, it is braced laterally and longitudinally of the airplane by the brace member 40 at all positions of the gear. If preferred, an automatic brake device may be employed in connection with the motor 30, whereby the motor operation will be instantaneously halted upon opening of the motor power circuit. Also, a suitable fairing may be mounted upon the mechanism if desired so as to shield the motor-gear parts thereof against the atmospheric elements whenever the gear is in extended position.

As illustrated in Fig. 4, the brace strut 40 is adapted to fit into the undercarriage receiving opening at the lower portion of the wing panel when the gear is in fully retracted condition; and it will be noted that the base plate portion 41 of the strut member 40 is so formed and arranged as to be then disposed in perfectly flush relation with respect to the contour of the skin structure at the lower surface of the wing panel, thus providing a perfectly smooth streamline surface for normal flight operations.

A particular feature and advantage of the undercarriage mechanism of the invention is that the entire mechanism is adapted to be constructed in the form of a compact and self-contained structure such as is adapted to be readily manufactured as a sub-assembly unit for subsequent attachment to the airplane by making a few simple connections thereto. As explained hereinabove, the landing gear mechanism illustrated and described herein in detail will be duplicated at the opposite side of the airplane so as to provide a duo-wheel type undercarriage; or any other number of similar units may be employed to provide a multiple wheel landing gear. Preferably, the motor mechanisms of the separate landing gear units will be arranged to operate in synchronism through use of any suitable synchronizing mechanism, of which several satisfactory types have been devised and are in use for such purposes. It will also be understood that in lieu of the land plane type of undercarriage illustrated and described hereinabove, the mechanism of the invention is applicable to equal advantage and facility in connection with retractable sea plane undercarriage arrangements; and that although only one form of the invention has been shown and described in detail, it will be apparent to those skilled in the art that the invention is not so limited but that various changes may be made therein without departing from the spirit of the invention or the scope of the appended claims.

What is claimed is:

1. An aircraft retractable undercarriage comprising a landing wheel strut having pivotally articulated upper and lower sections, a landing wheel carried at the lower end of said lower section, said upper section being pivotally mounted at its upper end upon said aircraft, a worm wheel sector fixed to said lower section concentrically with the pivot axis of said articulated connection, a worm meshing with said sector, a bearing rotatably mounting said worm upon said upper section to be positionally fixed thereto and to have its thrust axis directed generally upwardly toward the upper pivoted end of said upper strut section with the strut in extended position, a prime mover mounted upon said upper section adjacent the position of said worm and operatively connected to the latter, and strut brace means pivotally connected to said strut and extending laterally therefrom into pivotal connection with said aircraft at a position spaced from said pivotal connection of said upper strut section.

2. An aircraft retractable undercarriage comprising a landing wheel strut having pivotally articulated upper and lower sections, a landing wheel carried at the lower end of said lower section, said upper section being pivotally mounted at its upper end upon said aircraft, a worm wheel sector fixed to one of said sections concentrically with the pivot axis of said articulated connection, a worm meshing with said sector, a bearing rotatably mounting said worm upon the other of said sections to have its thrust axis extending generally toward an end portion of said other of said sections, and a prime mover mounted upon said other of said sections adjacent the position of said worm and operatively connected to the latter.

PEDRO S. YUJUICO.
DAVID B. THURSTON.